(Model.)
W. B. RICHARDSON.
COTTON STALK CUTTER AND PULLER.
No. 249,997. Patented Nov. 22, 1881.
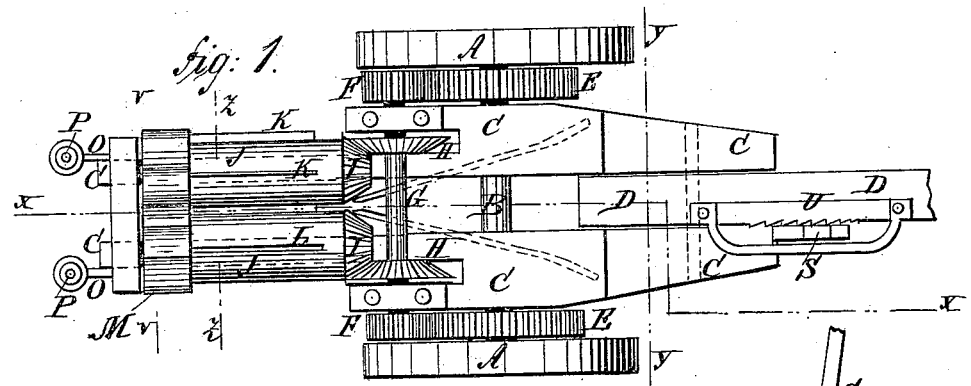
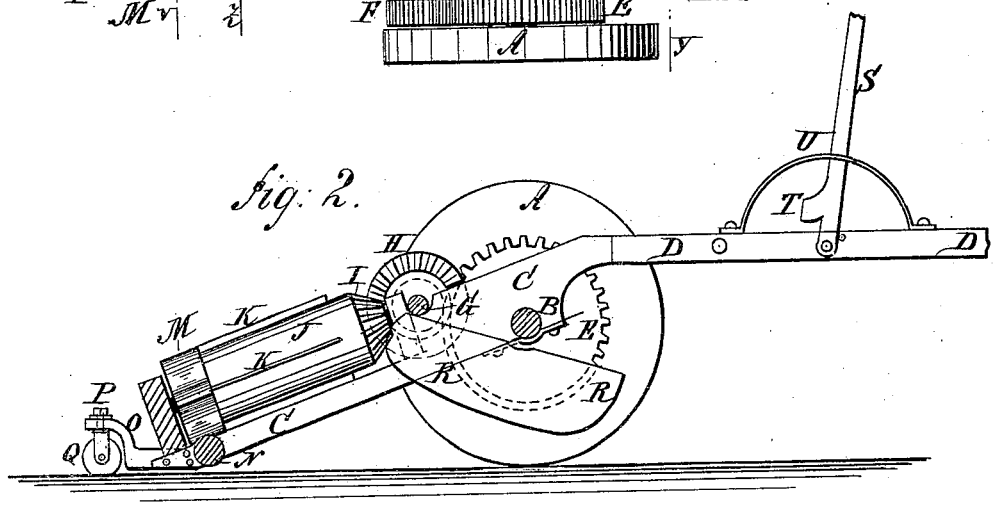
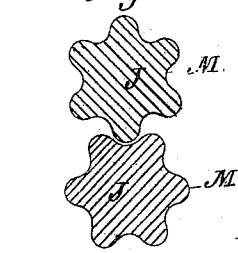
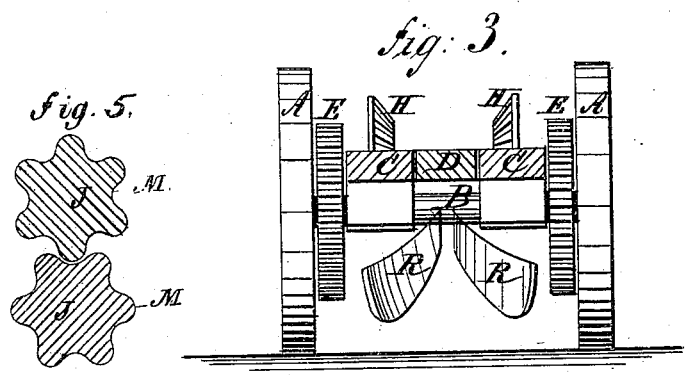
WITNESSES:
A. Schehl
C. Sedgwick
INVENTOR:
W. B. Richardson
BY Munn & Co
ATTORNEYS.
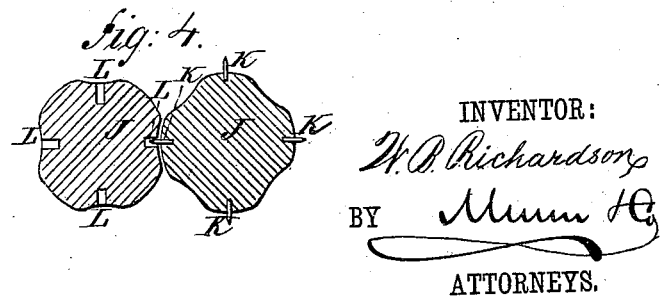
N. PETERS, Photo-Lithographer, Washington, D. C.

UNITED STATES PATENT OFFICE.

WILLIAM B. RICHARDSON, OF WOLF'S MILL, TEXAS, ASSIGNOR OF ONE-HALF TO THOMAS H. WESTBROOK AND WILLIAM G. WESTBROOK, BOTH OF SAME PLACE.

COTTON-STALK CUTTER AND PULLER.

SPECIFICATION forming part of Letters Patent No. 249,997, dated November 22, 1881.

Application filed May 6, 1881. (Model.)

*To all whom it may concern:*

Be it known that I, WILLIAM B. RICHARDSON, of Wolf's Mill, in the county of Hunt and State of Texas, have invented a new Improvement in Cotton-Stalk Cutters and Pullers, of which the following is a full, clear, and exact description.

Figure 1 is a plan view of my improvement. Fig. 2 is a sectional side elevation of the same, taken through the line x x, Fig. 1. Fig. 3 is a sectional end elevation, taken through the line y y, Fig. 1. Fig. 4 is a sectional end elevation of the cylinders, taken through the line z z, Fig. 1. Fig. 5 is a sectional end elevation of the cylinders, taken through the line v v, Fig. 1.

The object of this invention is to facilitate the removal of cotton-stalks from land in preparing it for subsequent cultivation.

A are the wheels, which are connected with the axle B by pawls and ratchets, so that they will carry the axle B with them in their forward revolution, but can be turned back without turning the said axle. The axle B revolves in bearings in the bars or frame C, with the forward end of which is connected the tongue D. The rear part of the frame C inclines downward until the rear end nearly reaches the ground.

To the axle B, at the inner sides of the wheels A, are attached large gear-wheels E, the teeth of which mesh into the teeth of the small gear-wheels F, attached to the ends of a shaft, G. The shaft G revolves in bearings attached to the frame C; and to the said shaft are also attached two beveled gear-wheels, H, the teeth of which mesh into the teeth of the beveled gear-wheels I, attached to or formed upon the forward ends of the cylinders J.

To the face of one or both the cylinders J are attached longitudinal knives K, which, as the said cylinders J revolve, enter longitudinal grooves L in the other cylinder. The lower parts of the cylinder J have cogs M, six inches (more or less) in length, attached to or formed on them, which cogs mesh into each other. The function of these cogs is to pull the stubs of the stalks left by the knives from the ground.

The journals of the cylinders J revolve in bearings attached to the frame C.

To the frame C, below the rear ends of the cylinders J, is pivoted a cross-roller, N. This roller is so placed that when the stubs of the stalks come in contact with it they are guided upward to the cogs M. This is more especially the case where the stub has a forward inclination, so that it would otherwise pass under the cogs without being grasped by them, in which case the roller lifts said stubs and forces them between the cogs, by which latter they are drawn from the ground, passed upward, and dropped over the back and to either side of the cylinders.

To the rear end of the frame C are attached brackets O, to which are swiveled the standards P of the small wheels Q, so that the said wheels Q can turn as the machine is turned. The wheels Q support the rear end of the frame C.

To the frame C are attached guides R, which project forward beneath the axle B and incline from each other toward their forward ends. The rear ends of the guides R approach each other and lead to the space between the forward ends of the cylinders J, so as to lead the stalks into the said space.

To the side of the tongue D is pivoted a lever, S, which has an arm or shoulder, T, upon the rear side of its lower part, resting upon the forward end of the frame C, so that the forward end of the said frame can be lowered and raised to raise and lower the rear end of the machine for convenience in passing from place to place. The lever S is held in any position into which it may be adjusted by an arched catch-bar, U, attached to the tongue D, and with the teeth of which the said lever engages.

With this construction, as the machine is drawn forward along a row of stalks, the guides R cause the said stalks to pass into the space between the cylinders J, where they are cut into pieces by the knives K. As the stalks approach the rear end of the cylinders the stubs come in contact with the roller N, by which they are guided (and if inclined forward are lifted) toward the cogs M. The latter thereupon grasps said stubs, draw them from the ground, pass them upward, and drop them over the outer sides and back of the cylinders.

With this machine the stalks are cut into small pieces, so that they will not interfere with the preparation of the ground for the next crop, and can be left upon the ground to fertilize it.

Having thus described my invention, what I claim as new, and desire to secure by Letters Patent, is—

1. The cylinders J J, carrying, respectively, the longitudinal knives and grooves, arranged lengthwise and on each side of the longitudinal axis of the machine, to operate as described.

2. The combination, with the rolls J J, provided with the cutting devices, of the cogs M, arranged upon their lower ends to mesh together to draw the stubs of the stalks from the ground, as described.

3. In a stalk-cutter, the combination, with the longitudinal knife-cylinders J J, of the cross-roller N, pivoted below the rear ends of said cylinders, and thus preventing the stalks from passing out between said rear ends, as described.

WM. B. RICHARDSON.

Witnesses:
L. P. WOLF,
R. C. FAISON.